(12) United States Patent
Nakamori et al.

(10) Patent No.: US 10,288,404 B2
(45) Date of Patent: May 14, 2019

(54) GEAR MEASUREMENT METHOD AND GEAR MEASUREMENT APPARATUS

(71) Applicant: JTEKT CORPORATION, Osaka-shi, Osaka (JP)

(72) Inventors: Misato Nakamori, Nishio (JP); Toshiya Morodome, Kashiba (JP); Rintaro Kohata, Toyohashi (JP); Keiya Kitabayashi, Toyohashi (JP); Tetsuya Fujita, Toyohashi (JP)

(73) Assignee: JTEKT CORPORATION, Osaka (JP)

( * ) Notice: Subject to any disclaimer, the term of this patent is extended or adjusted under 35 U.S.C. 154(b) by 154 days.

(21) Appl. No.: 15/472,590

(22) Filed: Mar. 29, 2017

(65) Prior Publication Data

US 2017/0292822 A1 Oct. 12, 2017

(30) Foreign Application Priority Data

Apr. 6, 2016 (JP) ................................. 2016-076291
Dec. 1, 2016 (JP) ................................. 2016-233721

(51) Int. Cl.
*G01B 5/20* (2006.01)
*G01B 5/16* (2006.01)

(52) U.S. Cl.
CPC ............ *G01B 5/202* (2013.01); *G01B 5/166* (2013.01)

(58) Field of Classification Search
CPC .................................. G01B 5/202; G01B 5/28
USPC ........ 33/501.14, 501.7, 501.11, 501.12, 551, 33/553, 554, 555, 503
See application file for complete search history.

(56) References Cited

U.S. PATENT DOCUMENTS

| | | | | | |
|---|---|---|---|---|---|
| 2,728,144 | A | * | 12/1955 | Nilsson | G01B 3/24 33/501.11 |
| 3,388,477 | A | * | 6/1968 | Hemmert | G01B 5/20 33/501.14 |
| 3,631,603 | A | * | 1/1972 | Munro | B65D 5/54 33/501.9 |
| 4,062,125 | A | * | 12/1977 | Maag | G01B 5/0002 33/501.14 |

(Continued)

FOREIGN PATENT DOCUMENTS

JP S61 70401 A 4/1986
JP 2009-264451 A 11/2009

(Continued)

OTHER PUBLICATIONS

Jun. 14, 2017 Extended Search Report issued in European Patent Application No. 17164168.1.

*Primary Examiner* — Christopher W Fulton
(74) *Attorney, Agent, or Firm* — Oliff PLC

(57) ABSTRACT

A gear measurement method and a gear measurement apparatus capable of evaluating meshing and fitting of a gear are provided. A measurement method for a gear includes a measurement step of measuring an actual movement locus of a ball that is moved along a tooth groove of the gear as a shape evaluation index for the gear. In the case of a VGR rack, tooth surfaces of rack teeth are constituted of curved surfaces. Thus, a reference pin for use in OPD cannot be disposed so as to be in line contact with the tooth surfaces, and the rack teeth cannot be measured. However, the ball can be disposed so as to be in point contact with the tooth surfaces, which enables a measurement of the rack teeth.

5 Claims, 19 Drawing Sheets

(56) References Cited

U.S. PATENT DOCUMENTS

| | | | | |
|---|---|---|---|---|
| 4,166,323 | A * | 9/1979 | Maag | G01B 7/283 |
| | | | | 33/501.9 |
| 4,285,133 | A * | 8/1981 | Sterki | G01B 21/20 |
| | | | | 33/1 M |
| 4,322,889 | A * | 4/1982 | Guenter | G01B 5/202 |
| | | | | 33/501.9 |
| 4,519,141 | A * | 5/1985 | Meder | G01B 5/202 |
| | | | | 33/501.9 |
| 6,158,136 | A * | 12/2000 | Gotz | G01B 3/008 |
| | | | | 33/503 |
| 6,460,261 | B1 * | 10/2002 | Noda | G01B 5/241 |
| | | | | 33/199 R |
| 8,991,246 | B2 * | 3/2015 | Hirono | G01B 5/008 |
| | | | | 33/503 |
| 9,879,968 | B2 * | 1/2018 | Grant, Jr. | G01B 5/008 |
| 2005/0262715 | A1 * | 12/2005 | Looser | G01B 5/12 |
| | | | | 33/501.11 |
| 2014/0311817 | A1 | 10/2014 | Kita et al. | |

FOREIGN PATENT DOCUMENTS

| | | |
|---|---|---|
| JP | 2014-210495 A | 11/2014 |
| WO | 2015/097919 A1 | 7/2015 |
| WO | 2015/166035 A1 | 11/2015 |

\* cited by examiner

GEAR MEASUREMENT METHOD AND GEAR MEASUREMENT APPARATUS

INCORPORATION BY REFERENCE

The disclosure of Japanese Patent Application No. 2016-076291 filed on Apr. 6, 2016 and No. 2016-233721 filed on Dec. 1, 2016 including the specification, drawings and abstract, is incorporated herein by reference in its entirety.

BACKGROUND OF THE INVENTION

1. Field of the Invention

The present invention relates to a gear measurement method and a gear measurement apparatus.

2. Description of the Related Art

A rack-and-pinion steering device is used as a device that converts rotational motion of a steering shaft into linear motion of a rack shaft, to which steered wheels are coupled, in the axial direction in order to transfer a steering force of a steering wheel to the steered wheels. In a rack-and-pinion mechanism, management of meshing of rack teeth formed on the rack shaft is a very important factor because of the nature that some backlash is provided in the meshing region between the rack teeth and pinion teeth formed on a pinion shaft to control meshing torque.

To evaluate meshing of the rack teeth, over pin diameter variation curve management by an over pin diameter measurement method (hereinafter referred to as "OPD") is used (see Japanese Patent Application Publication No. 2009-264451 (JP 2009-264451 A)). In the OPD, a process in which a reference pin suited to the rack teeth is disposed in the tooth groove of the rack teeth so as to be in line contact with the opposing tooth surfaces and the height from a reference position of the rack shaft to a measurement position of the reference pin is measured is executed for all the tooth grooves, and obtained values are plotted in a graph to be evaluated as design values. Specifically, a point at which a line that is orthogonal to the center axis of the reference pin and the center axis of the rack shaft crosses the outer peripheral surface of the rack shaft and a point at which such a line crosses the outer peripheral surface of the reference pin are calculated, for example, and the distance between the two crossing points is measured as the measurement height.

In rack-and-pinion steering devices of recent years, a rack with a variable gear ratio (hereinafter referred to as a "VGR rack") is occasionally used for the purpose of improving the steering feel etc. In the VGR rack, the steering gear ratio is varied in accordance with a steering angle by making the specifications of the rack teeth (such as a module of the rack teeth and the pressure angle) which constitute the rack-and-pinion mechanism different in accordance with the position in the axial direction of the rack shaft That is, the steering device occasionally uses a VGR rack which has a group of rack teeth with planar rack tooth surfaces and a group of rack teeth with curved rack tooth surfaces. (See Japanese Patent Application Publication No. 2014-210495 (JP 2014-210495 A), for example.)

A steering column that internally houses the steering shaft uses a contractible structure for the purpose of absorbing a shock at the time of a collision of a vehicle. The steering column includes an upper shaft that extends from a steering wheel side and a lower shaft that extends from a steering gear box side, and the two shafts are fitted with each other through splines. Hence, management of fitting through splines is a very important factor. To evaluate fitting through splines, between pin diameter variation curve management is used which includes a method (between pin method (hereinafter referred to as "BPD") in which a pin is placed in a tooth groove between opposing splines and the diameter of a maximum inscribed circle (diameter of a maximum circumscribed circle) that contacts the vertexes of the pin is measured.

The OPD discussed above is applicable to a rack with a constant gear ratio (hereinafter referred to as a "CGR rack"), that is, a rack in which the tooth surfaces of all the rack teeth are planar. In the VGR rack, however, the tooth surfaces of the rack teeth in the region in which the gear ratio is varied are constituted as curved surfaces, that is, three-dimensionally undulating. Therefore, the reference pin cannot be disposed in the tooth groove of the rack teeth so as to be in line contact with the opposing tooth surfaces, and the OPD cannot be used. In the BPD discussed above, meanwhile, a distance between two points positioned in a tooth groove of splines is measured, and fitting over the entire periphery within the fitting length of the splines cannot be evaluated.

SUMMARY OF THE INVENTION

It is an object of the present invention to provide a gear measurement method and a gear measurement apparatus capable of evaluating meshing and fitting of a gear including a rack with a variable gear ratio.

An aspect of the present invention provides a gear measurement method including the step of measuring an actual movement locus of a ball that is moved along a tooth groove of a gear as a shape evaluation index for the gear.

With this configuration, the measurement is not affected by the direction of the teeth of the gear, which enables evaluation of meshing and fitting of the gear. In the case of a VGR rack, for example, the tooth surfaces of the rack teeth are constituted of curved surfaces. Thus, a reference pin for use in OPD cannot be disposed so as to be in line contact with the tooth surfaces, and the rack teeth cannot be measured. However, the ball can be disposed so as to be in point contact with the tooth surfaces, which enables a measurement of the rack teeth. In the case of splines, meanwhile, fitting over the entire periphery within the fitting length of the splines can be evaluated by rolling the ball along the tooth grooves of all the splines.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Rack teeth of a rack shaft and splines of a steering shaft will be described as examples of a gear to which a gear measurement method according to an embodiment of the present invention is applicable. However, the subject of application of the present invention is not limited to the rack teeth or the splines. A steering system of an automobile that includes the rack teeth and the splines will be described with reference to the drawings.

Figure 1:
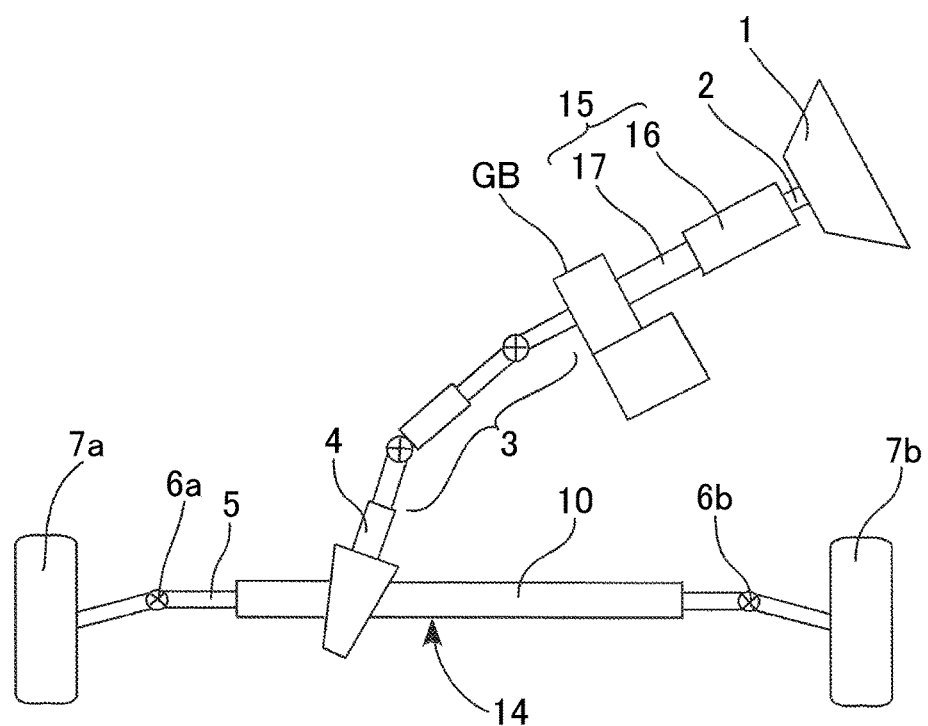
FIG. 1 is a schematic view of the entire steering system of an automobile including rack teeth and splines that are applicable to a gear measurement method according to an embodiment of the present invention.

As illustrated in FIG. 1, the steering system of the automobile includes a steering wheel 1 that is operable by a driver, a steering shaft 2 coupled to the steering wheel 1, a steering column 15 that internally houses the steering shaft 2, a rack-and-pinion steering device 14, an intermediate shaft 3 that connects the steering shaft 2 and the rack-and-pinion steering device 14, steered wheels 7a and 7b coupled to ends of the rack-and-pinion steering device 14, and so forth.

Figure 2:
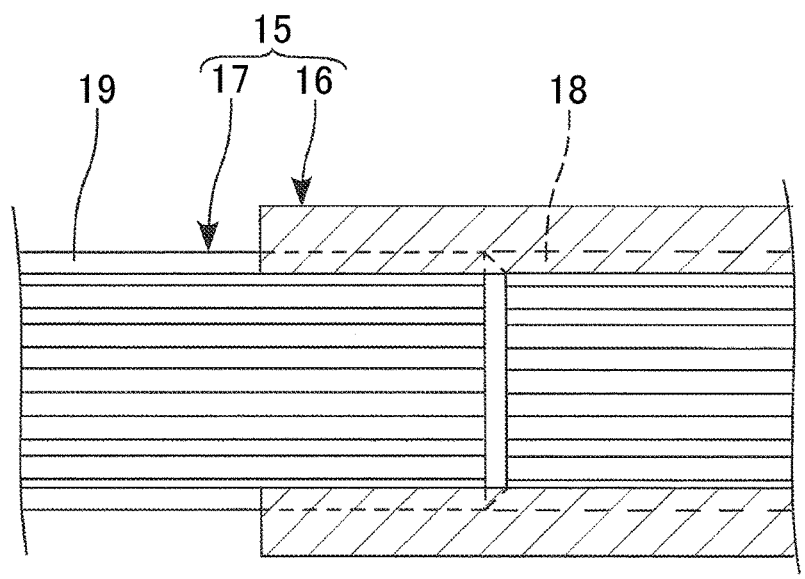
FIG. 2 is a sectional view of a steering column taken along the axial direction of a shaft.

The steering column 15 includes an upper shaft 16 that extends from a steering wheel 1 side and a lower shaft 17 that extends from a steering gear box GB side. As illustrated in FIG. 2, the upper shaft 16 and the lower shaft 17 are fitted with each other through inside splines 18 provided on the upper shaft 16 and outside splines 19 provided on the lower shaft 17. This provides the upper shaft 16 and the lower shaft 17 with a telescopic structure, which enables absorbing a shock at the time of a collision of a vehicle. In FIG. 1, components that surround the steering shaft 2 are not illustrated.

Figure 3:
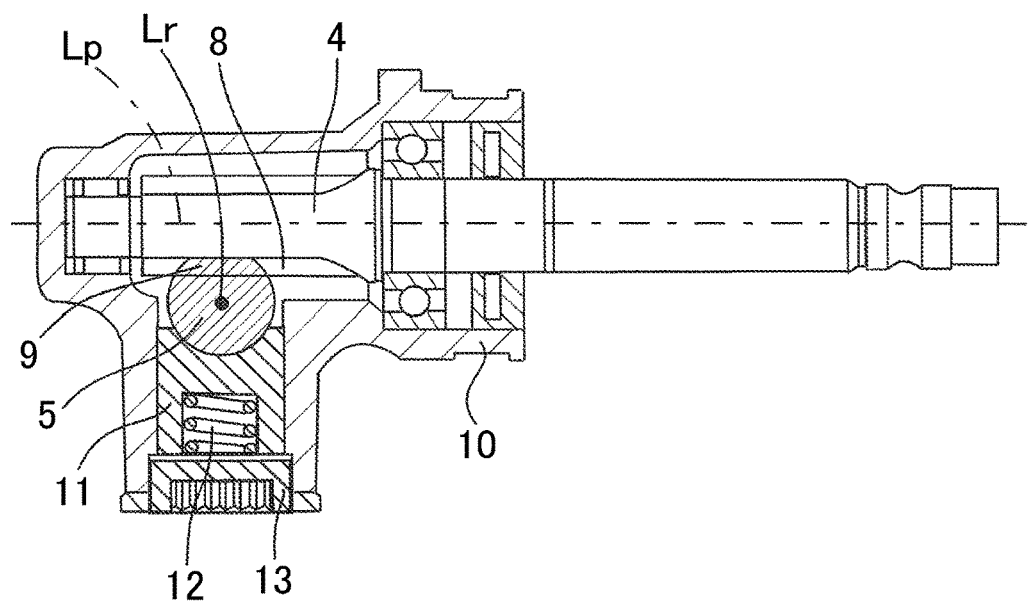
FIG. 3 is a sectional view of a rack-and-pinion steering device of FIG. 1 taken along the axial direction of a pinion.

The rack-and-pinion steering device 14 includes a pinion shaft 4 that serves as an input shaft, a rack shaft 5 that serves as an output shaft, a rack housing 10 that houses such components, and so forth. Inner ball joints 6a and 6b are coupled to both ends of the rack shaft 5. As illustrated in FIG. 3, rack teeth 9 are formed on the rack shaft 5, and pinion teeth 8 to be meshed with the rack teeth 9 are formed on the pinion shaft 4.

The rack shaft 5 is meshed with the pinion shaft 4 through a rack guide 11, a spring 12, and a guide plug 13 disposed inside the rack housing 10 on the opposite side of the rack shaft 5 from the pinion shaft 4. That is, the rack guide 11 is housed in the rack housing 10 so as to be movable in a direction that is orthogonal to a center axis Lr of the rack shaft 5 and a center axis Lp of the pinion shaft 4. One end side (upper side in the drawing) of the rack guide 11 in the movement direction abuts against a portion of the peripheral surface (arc outer peripheral surface) of the rack shaft 5 that is on the opposite side of the rack shaft 5 from the pinion shaft 4, and the other end side (lower side in the drawing) of the rack guide 11 in the movement direction opposes the guide plug 13, which is screwed to the rack housing 10, via a gap.

The spring 12 is interposed between the rack guide 11 and the guide plug 13. This allows the rack shaft 5 to be pressed against the pinion shaft 4 by the elastic force of the spring 12. As a result of this pressing, the pinion teeth 8 and the rack teeth 9 are meshed with each other via no gap, which prevents the rack shaft 5 from being moved apart from the pinion shaft 4 even if the pinion shaft 4 is rotated by steering.

The rack shaft 5 is supported by a meshing portion between the rack teeth 9 and the pinion teeth 8, which is disposed on a first end side of the rack housing 10, and a lubricative rack bushing (not illustrated) disposed on the inner peripheral surface of the rack housing 10 on a second end side of the rack housing 10. Consequently, the rack shaft 5 is configured to be smoothly movable in the axial direction without directly contacting the rack housing 10.

In the steering system for an automobile configured as described above, a steering force of the driver applied to the steering wheel 1 is transferred as a rotational force of the pinion shaft 4 from the steering shaft 2 by way of the intermediate shaft 3. The rotational force of the pinion shaft 4 is converted into a force in the axial direction of the rack shaft 5, and transferred to the steered wheels 7a and 7b from the inner ball joints 6a and 6b which are coupled to both ends of the rack shaft 5. The rack shaft 5 is not moved apart from the pinion shaft 4 even if the pinion shaft 4 is rotated by steering, which enables stable steering that provides a high sense of rigidity.

The rack-and-pinion steering device 14 uses a VGR rack with a steering gear ratio that is varied in accordance with the steering angle, that is, a VGR rack in which the specifications (such as a module of the rack teeth 9 and the pressure angle) of the rack teeth 9 are different in accordance with the position in the axial direction of the rack shaft 5.

Figure 4:
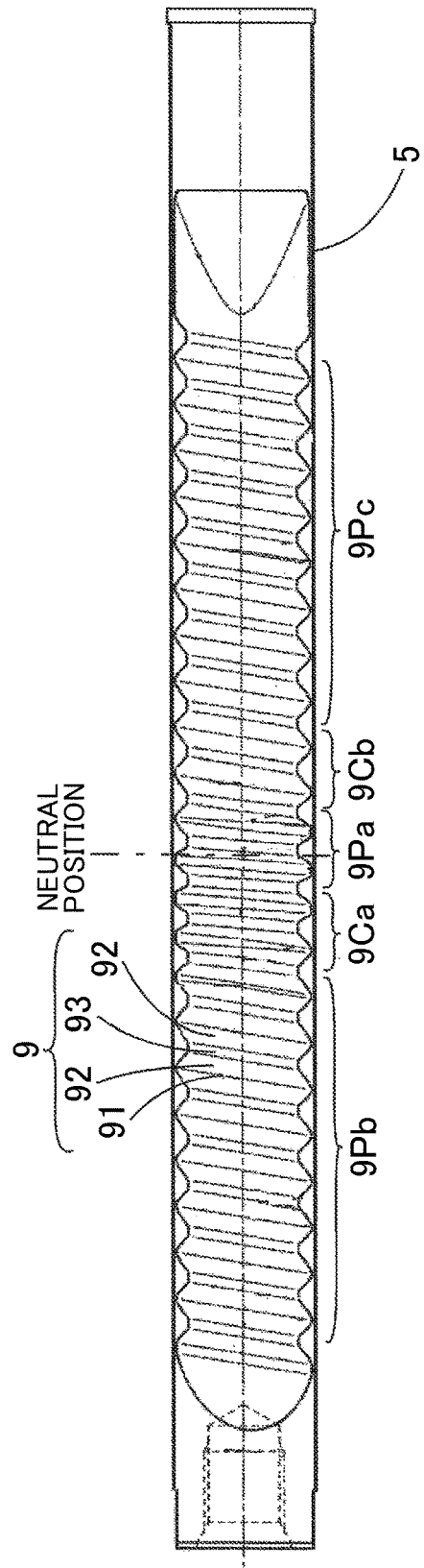
FIG. 4 is a plan view illustrating a rack of the rack-and-pinion steering device of FIG. 1.

As illustrated in FIG. 4, the center portion (around the steering neutral position) and both end portions of the rack shaft 5 of the VGR rack are formed as first rack tooth groups 9Pa, 9Pb, and 9Pc in which tooth surfaces 92 are planar surfaces, that is, regions with a constant gear ratio, and portions of the rack shaft 5 interposed between the center portion and the end portions are formed as second rack tooth groups 9Ca and 9Cb in which the tooth surfaces 92 are curved surfaces, that is, regions with a variable gear ratio. The VGR rack cannot be formed by cutting (such as broaching and hobbing) as with a CGR rack but is formed by forging, and thus crowning is formed at tooth tips 93 of the rack teeth 9. Tooth grooves 91 are each formed between opposing tooth surfaces 92 of adjacent rack teeth 9.

Figure 5:
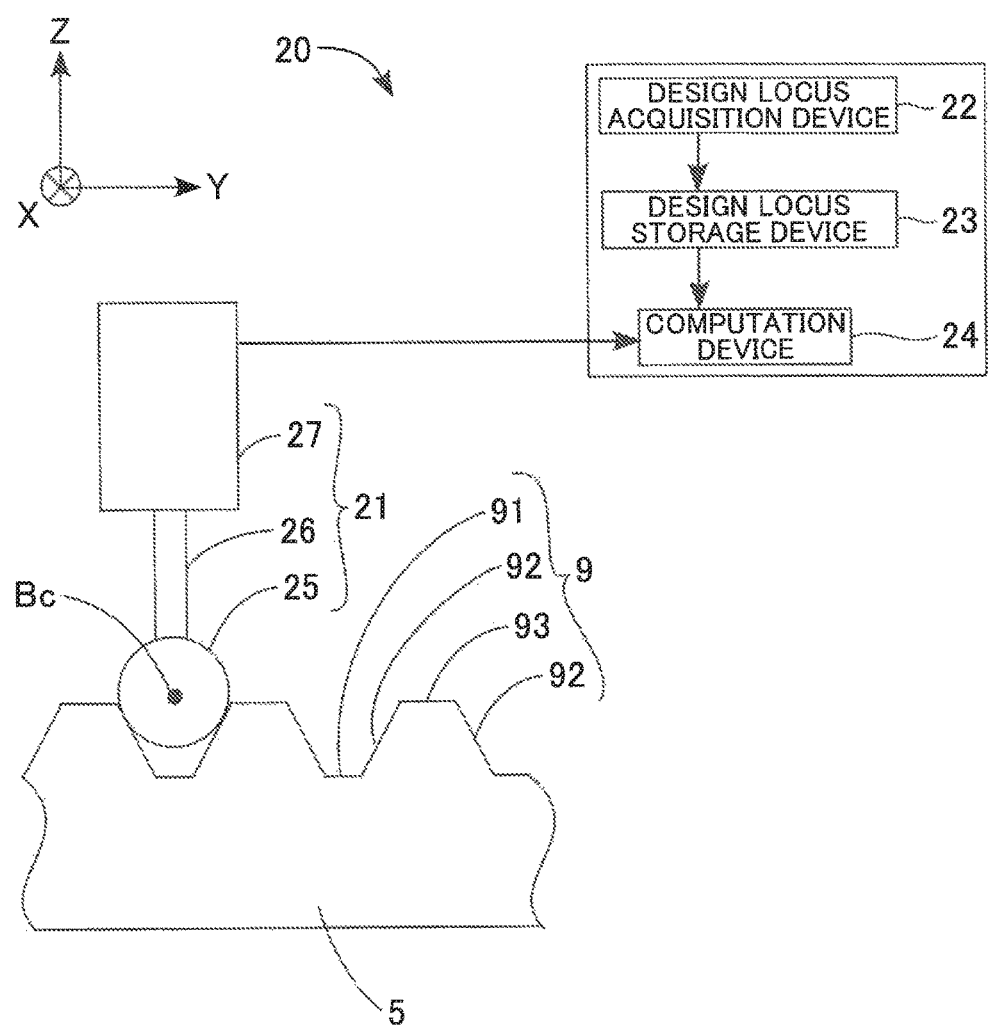
FIG. 5 illustrates a gear measurement apparatus and rack teeth according to the embodiment of the present invention.

Next, a gear measurement apparatus according to the embodiment of the present invention will be described with reference to the drawings. As illustrated in FIG. 5, the gear measurement apparatus 20 includes a measurement device 21, a design locus acquisition device 22, a design locus storage device 23, and a computation device 24. The measurement device 21 includes a probe 26 that has a ball 25 at the distal end thereof, a movement device 27 capable of moving the probe 26 in the directions of three orthogonal axes (X axis, Y axis, and Z axis), and so forth. In the example, the measurement device 21 is a three-dimensional measuring instrument that has a groove copying function. The gear measurement apparatus 20 can measure the rack teeth 9 and the inside splines 18. Measurement of the rack teeth 9 will be described first, and measurement of the inside splines 18 will be described next.

In the case where the rack teeth 9 are measured using the gear measurement apparatus 20, the ball 25 is formed with a diameter that enables the ball 25 to contact the opposing tooth surfaces 92 which form the tooth groove 91 of the rack teeth 9. The measurement device 21 measures a movement locus (hereinafter referred to as an "actual movement locus") of a center point Bc of the ball 25 as a shape evaluation index for the rack teeth 9 when the ball 25 is disposed in the tooth groove 91 of the rack teeth 9 as the subject to be measured so as to be in point contact with the opposing tooth surfaces 92 at the same time and the ball 25 is moved along the tooth groove 91.

The reason for using the ball 25 is as follows. A center axis obtained when the reference pin for use in the OPD is disposed in the tooth groove of the rack teeth of the CGR rack so as to be in line contact with the opposing tooth surfaces is a group of points. Meanwhile, a locus of the center point Bc of the ball 25 obtained when the ball 25 is disposed in the tooth groove of the rack teeth of the CGR rack so as to be in point contact with the opposing tooth surfaces and is moved along the tooth groove is also a group of points. In the case of the VGR rack, the tooth surfaces 92 of the rack teeth 9 are constituted of curved surfaces. Thus, the reference pin cannot be disposed so as to be in line contact with the tooth surfaces 92, and the rack teeth 9 cannot be measured. However, the ball 25 can be disposed so as to be in point contact with the tooth surfaces 92, and thus the rack teeth 9 can be measured.

The design locus acquisition device 22 acquires design data on the tooth groove 91 of the rack teeth 9 in design. The design locus acquisition device 22 acquires a movement locus (hereinafter referred to as a "design locus") of the center point Bc of the ball 25 for a case where the ball 25 is moved along the tooth groove 91 in the acquired design data. The design locus storage device 23 stores the design locus which is acquired by the design locus acquisition device 22. The computation device 24 computes an error between the actual movement locus which is measured by the measurement device 21 and the design locus which is stored in the design locus storage device 23.

Figure 8:
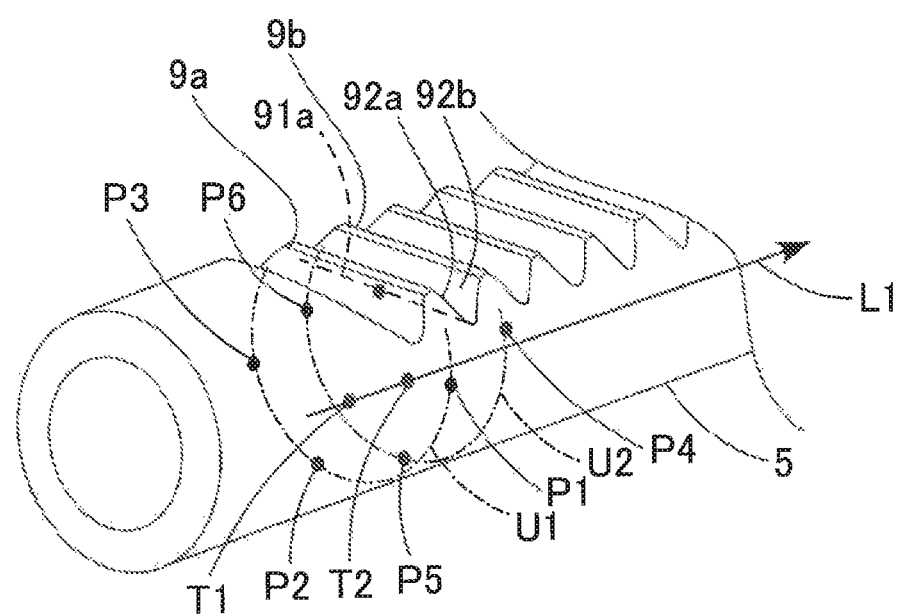
FIG. 8 is a perspective view illustrating a method of deciding the Y-axis direction in a tooth groove of the rack teeth.

Next, operation for a case where the rack teeth 9 are measured using the gear measurement apparatus 20 will be described with reference to the drawings. This measurement needs to be performed individually for all the rack teeth 9 formed on the rack shaft 5. In the following description, however, as illustrated in FIG. 8, the measurement is performed for a tooth groove 91a between tooth surfaces 92a and 92b of rack teeth 9a and 9b, respectively, that belong to the second rack tooth group, among the rack teeth 9 which are effectively meshed with the pinion teeth 8 (see FIG. 3). The design locus acquisition device 22 has already acquired a design locus which is a movement locus, in design, of the center point Bc of the ball 25 for a case where the ball 25 is moved along the tooth groove 91 of the rack teeth 9, and stored the acquired design locus in the design locus storage device 23.

Figure 6:
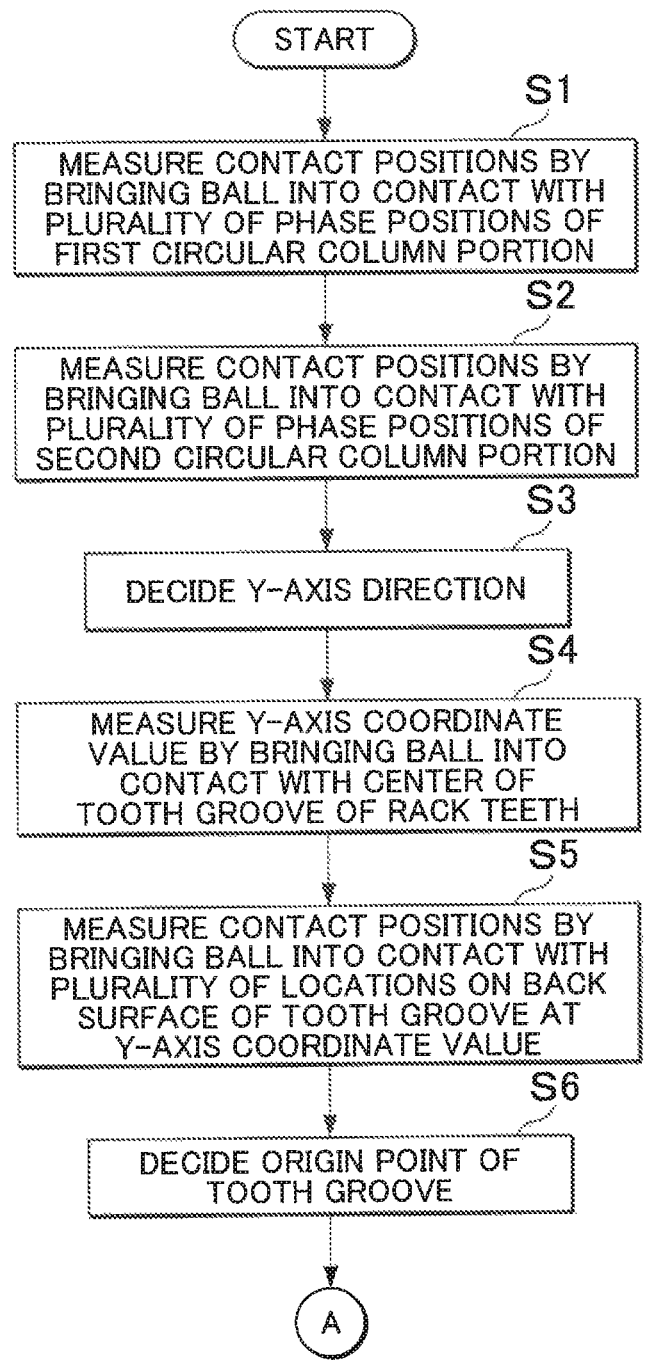
FIG. 6 is a flowchart illustrating operation of the gear measurement apparatus to measure the rack teeth.

First, the measurement device 21 measures contact positions by bringing the ball 25 into contact with a plurality of phase positions of a first cylindrical column portion, to be discussed later, of the rack shaft 5 (step S1 of FIG. 6), and measures contact positions by bringing the ball 25 into contact with a plurality of phase positions of a second cylindrical column portion, to be discussed later, of the rack shaft 5 (step S2 of FIG. 6). The Y-axis direction of the tooth groove 91a as the subject to be measured is decided on the basis of the measured contact positions (step S3 of FIG. 6).

Specifically, as illustrated in FIG. 8, contact positions are measured by bringing the ball 25 into contact with three phase positions P1, P2, and P3, for example, of a first cylindrical column portion U1 of the rack shaft 5 which includes the rack teeth 9a which have the tooth surfaces 92a. Similarly, contact positions are measured by bringing the ball 25 into contact with three phase positions P4, P5, and P6, for example, of a second cylindrical column portion U2 of the rack shaft 5 which includes the rack teeth 9b which have the tooth surfaces 92b. A center point T1 of a circle that passes through the phase positions P1, P2, and P3 is calculated, a center point T2 of a circle that passes through the phase positions P4, P5, and P6 is calculated, and the direction of a line L1 that passes through the center points T1 and T2 is decided as the Y-axis direction of the tooth groove 91a.

The measurement device 21 decides a reference point, to be discussed later, of the tooth groove 91a on the basis of a measurement of an arc outer peripheral surface positioned on the back side of the tooth groove 91a, and determines the decided reference point of the tooth groove 91a as the origin point. That is, the measurement device 21 measures a Y-axis coordinate value by bringing the ball 25 into contact with the center of the tooth groove 91a in the tooth trace direction (step S4 of FIG. 6). Contact positions are measured by bringing the ball 25 into contact with a plurality of locations on the back surface of the tooth groove 91a at the measured Y-axis coordinate value (step S5 of FIG. 6), and the origin point of the tooth groove 91a is decided (step S6 of FIG. 6).

Figure 9:
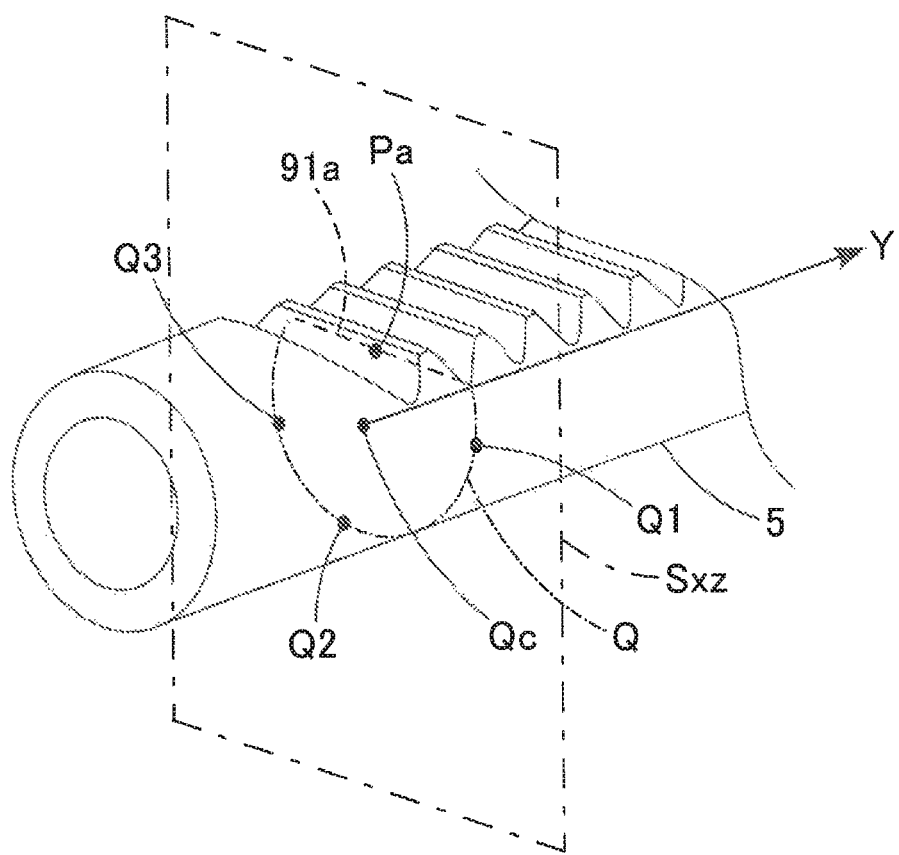
FIG. 9 is a perspective view illustrating a method of deciding the origin point in the tooth groove of the rack teeth.

Specifically, as illustrated in FIG. 9, the Y-axis coordinate value of a center position Pa of the tooth groove 91a in the tooth trace direction is measured using the ball 25. Three positions Q1, Q2, and Q3 on an outer peripheral edge Q of the rack shaft 5 as cut at a plane Sxz that passes through the measured center position Pa and that is orthogonal to the Y-axis direction are measured using the ball 25, an arc center Qc of the outer peripheral edge Q as the reference point is calculated from the measured positions Q1, Q2, and Q3, and the calculated arc center Qc is decided as the origin point of the tooth groove 91a.

Figure 7:
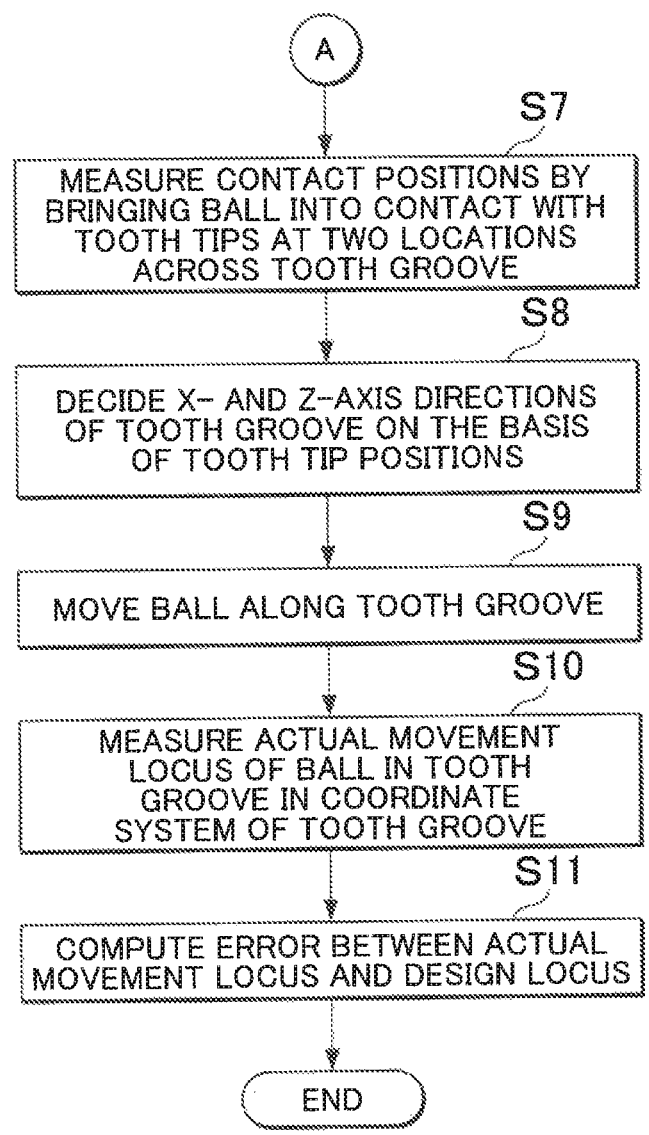
FIG. 7 is a flowchart illustrating a continuation of the operation of the gear measurement apparatus.

The measurement device 21 measures contact positions by bringing the ball 25 into contact with two tooth tips 93a and 93b (see FIG. 10) that interpose the tooth groove 91a (step S7 of FIG. 7), and the X-axis direction and the Z-axis direction (two-dimensional coordinate system) of the tooth groove 91a are decided on the basis of the measured tooth tip positions (step S8 of FIG. 7).

Figure 10:
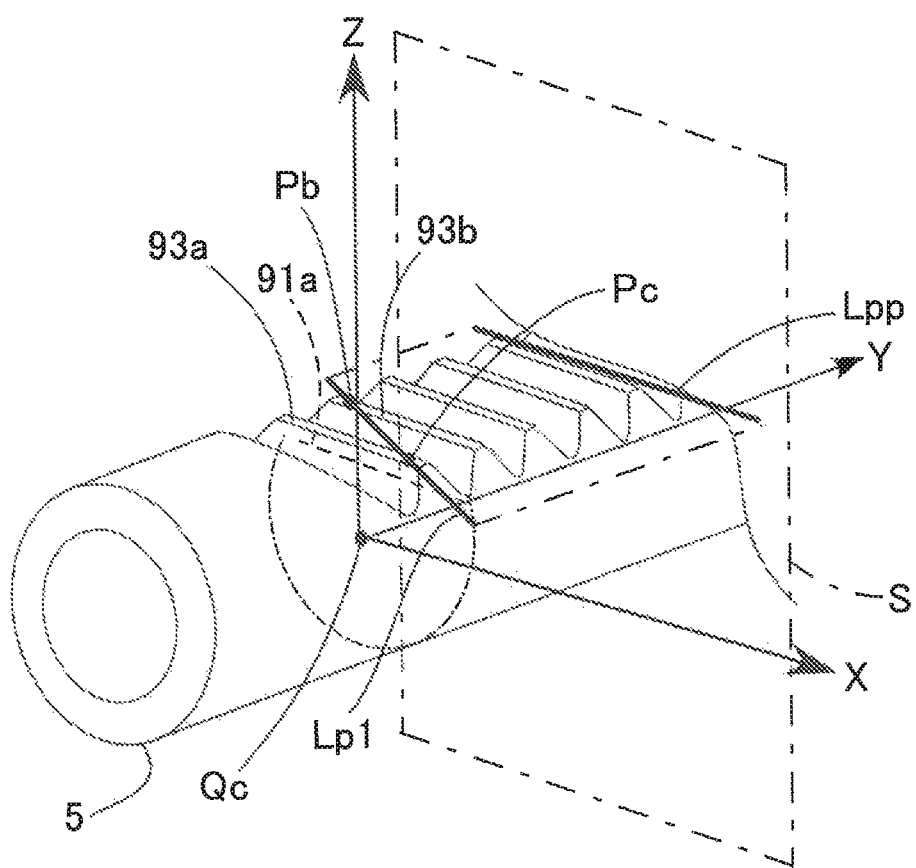
FIG. 10 is a perspective view illustrating a method of deciding the X- and Z-axis directions in the tooth groove of the rack teeth.

Specifically, as illustrated in FIG. 10, two positions Pb and Pc of the two tooth tips 93a and 93b which interpose the tooth groove 91a are measured using the ball 25. The position Pb is on one end portion side in the tooth trace direction and the position Pc is on the other end portion side in the tooth trace direction. A line Lp1 that passes through the two positions Pb and Pc is projected onto a plane S that is orthogonal to the Y axis. The direction of a line Lpp obtained as a result of the projection is decided as the X-axis direction of the tooth groove 91a, and a direction that is orthogonal to the decided X-axis direction and the Y-axis direction is decided as the Z-axis direction.

The measurement device 21 moves the ball 25 along the tooth groove 91a (step S9 of FIG. 7), and measures the actual movement locus of the ball 25 in the tooth groove 91a in the coordinate system (X, Y, Z) of the tooth groove 91a (step S10 of FIG. 7). The computation device 24 computes an error in the Z-axis direction between the actual movement locus which is measured by the measurement device 21 and the design locus which is stored in the design locus storage device 23 (step S11 of FIG. 7, corresponding to the computation step of the present invention), and the process is ended.

Figure 11:
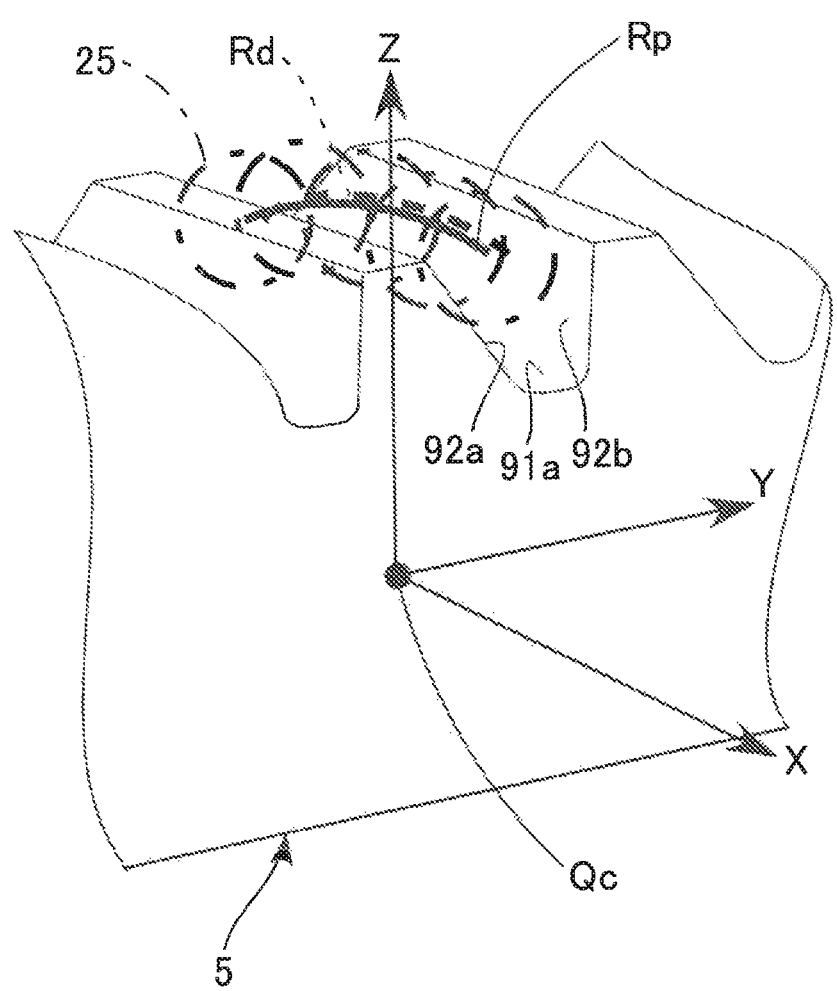
FIG. 11 is a perspective view illustrating a method of calculating an error in the Z-axis direction between an actual movement locus and a design locus in the tooth groove of the rack teeth.

Specifically, as illustrated in FIG. 11, an actual movement locus Rp measured by the measurement device 21 is curved as indicated by the continuous line in the drawing, a design locus Rd acquired by the design locus acquisition device 22 is curved as indicated by the dashed line in the drawing, and thus an error in the Z-axis direction between such loci is calculated.

Figure 12:
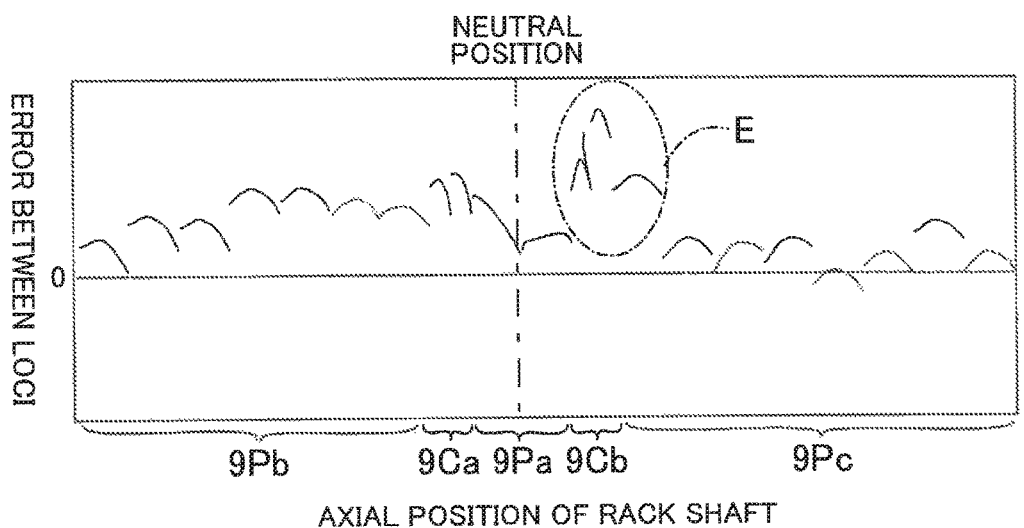
FIG. 12 illustrates the result of measuring a defective rack using the gear measurement apparatus, with the vertical axis indicating an error between the actual movement locus and the design locus and with the horizontal axis indicating the axial position of the rack teeth.

FIG. 12 illustrates the result of measuring a certain rack shaft 5 using the measurement apparatus 20 for the rack teeth 9, with the vertical axis indicating the error between the actual movement locus Rp and the design locus Rd and with the horizontal axis indicating the axial position of the rack teeth 9. As is clear from FIG. 12, the error between the actual movement locus Rp and the design locus Rd of the rack shaft 5 significantly varies around the second rack tooth group 9Cb (a part E surrounded by the dashed circle in the drawing).

Figure 13:
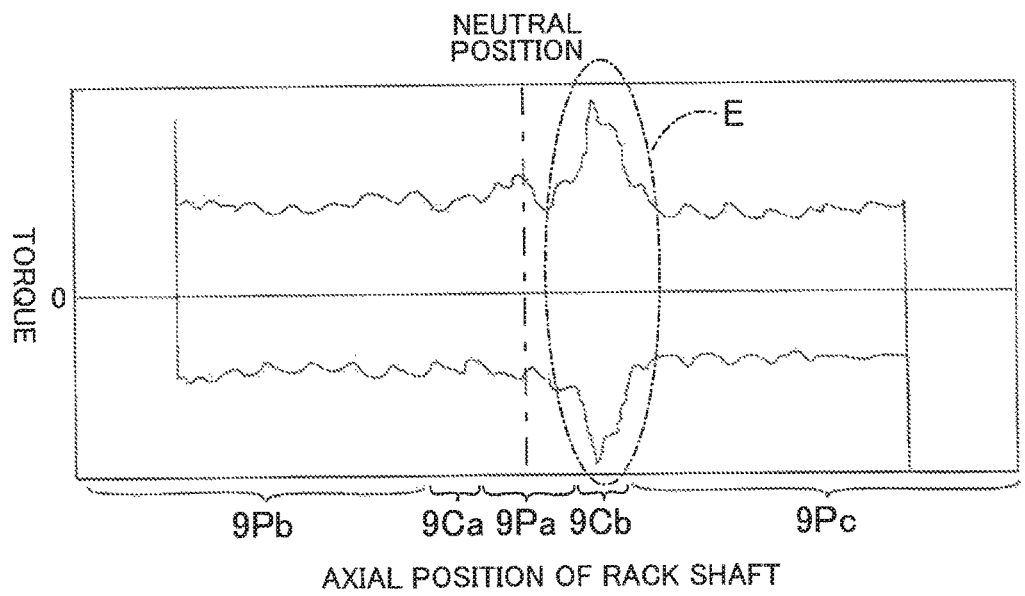
FIG. 13 indicates torque generated by a rack-and-pinion steering device that has the defective rack on the vertical axis and the axial position of the rack teeth on the horizontal axis.

In the case of the rack-and-pinion steering device 14 which includes such a rack shaft 5, as indicated in FIG. 13, torque jumped up around the second rack tooth group 9Cb (a part E surrounded by the dashed circle in the drawing). This rack shaft 5 turned out to be defective. FIG. 13 illustrates an event in which the pinion teeth 8 are reciprocally moved in the axial direction of the rack teeth 9.

Figure 14:
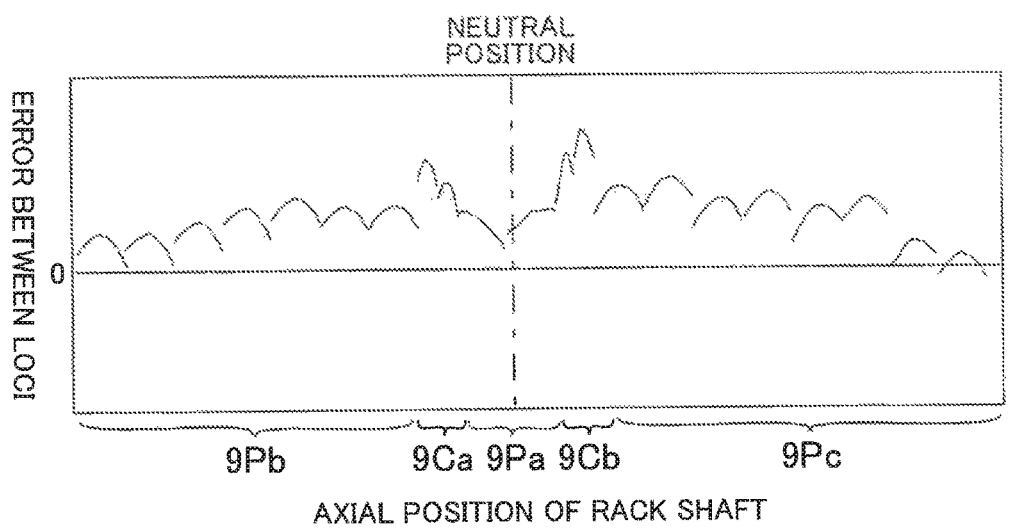
FIG. 14 illustrates the result of measuring a conforming rack using the gear measurement apparatus, with the vertical axis indicating an error between the actual movement locus and the design locus and with the horizontal axis indicating the axial position of the rack teeth.
Figure 15:
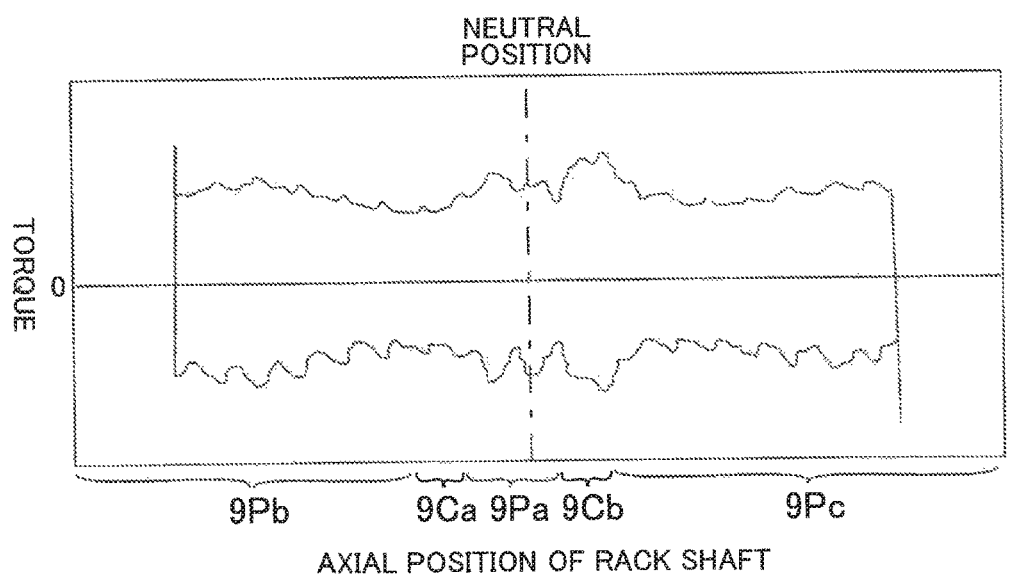
FIG. 15 indicates torque generated by a rack-and-pinion steering device that has the conforming rack on the vertical axis and the axial position of the rack teeth on the horizontal axis.

Meanwhile, FIG. 14 corresponds to FIG. 12, and illustrates the result of measuring a different rack shaft 5 using the measurement apparatus 20 for the rack teeth 9. As is clear from FIG. 14, the error between the actual movement locus Rp and the design locus Rd of the rack shaft 5 does not significantly vary. In the case of the rack-and-pinion steering device 14 which includes such a rack shaft 5, as indicated in FIG. 15 corresponding to FIG. 13, torque did not jump up, and substantially constant torque was obtained. This rack shaft 5 turned out to be conforming.

Thus, the result (locus error) of the measurement by the measurement apparatus 20 for the rack teeth 9 according to the embodiment turned out to be correlated with the gear performance (torque waveform) of the rack-and-pinion steering device 14. Hence, the measurement apparatus 20 for the rack teeth 9 according to the embodiment can evaluate meshing of the VGR rack. In addition, the position and the amount of crowning on the rack teeth 9 can be digitized and visualized, and thus can be reflected in conditions for manufacture including plastic working.

Figure 16:
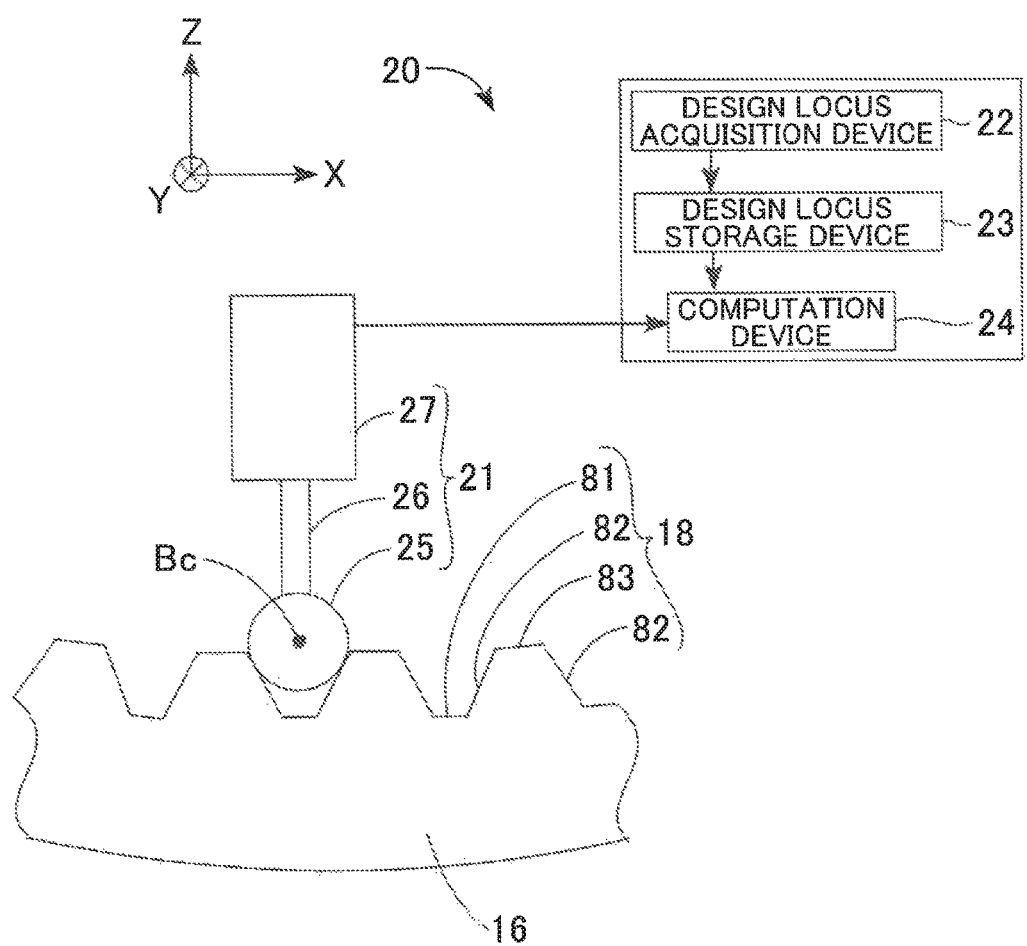
FIG. 16 illustrates the gear measurement apparatus and inside splines according to the embodiment of the present invention.

Next, a method of measuring the inside splines using the gear measurement method according to the embodiment of the present invention will be described. As illustrated in FIG. 16, in the case where the inside splines 18 are measured using the gear measurement apparatus 20, the ball 25 is formed with a diameter that enables the ball 25 to contact opposing tooth surfaces 82 which form a tooth groove 81 of the inside splines 18. The measurement device 21 measures a movement locus (hereinafter referred to as an "actual movement locus") of a center point Bc of the ball 25 as a shape evaluation index for the inside splines 18 when the ball 25 is disposed in the tooth groove 81 of the inside splines 18 as the subject to be measured so as to be in point contact with the opposing tooth surfaces 82 at the same time and the ball 25 is moved along the tooth groove 81.

The design locus acquisition device 22 acquires design data on the tooth groove 81 of the inside splines 18 in design. The design locus acquisition device 22 acquires a movement locus (hereinafter referred to as a "design locus") of the center point Bc of the ball 25 for a case where the ball 25 is moved along the tooth groove 81 in the acquired design data. The design locus storage device 23 stores the design locus which is acquired by the design locus acquisition device 22. The computation device 24 computes a radius error and a phase error, to be discussed later, on the basis of the actual movement locus which is measured by the measurement device 21 and the design locus which is stored in the design locus storage device 23.

Next, operation for a case where the inside splines 18 are measured using the gear measurement apparatus 20 will be described with reference to the drawings. This measurement needs to be performed individually within the effective fitting length (see FIG. 18), that is, within a range from a starting end To of the inside splines 18 over a length T in the axial direction in which fitting is effective, for all the inside splines 18 formed on the upper shaft 16. The design locus acquisition device 22 has already acquired a design locus which is a movement locus, in design, of the center point Bc of the ball 25 for a case where the ball 25 is moved within the effective fitting length T (see FIG. 18) along all the tooth grooves 81 of the inside splines 18, and stored the acquired design locus in the design locus storage device 23.

Figure 17:
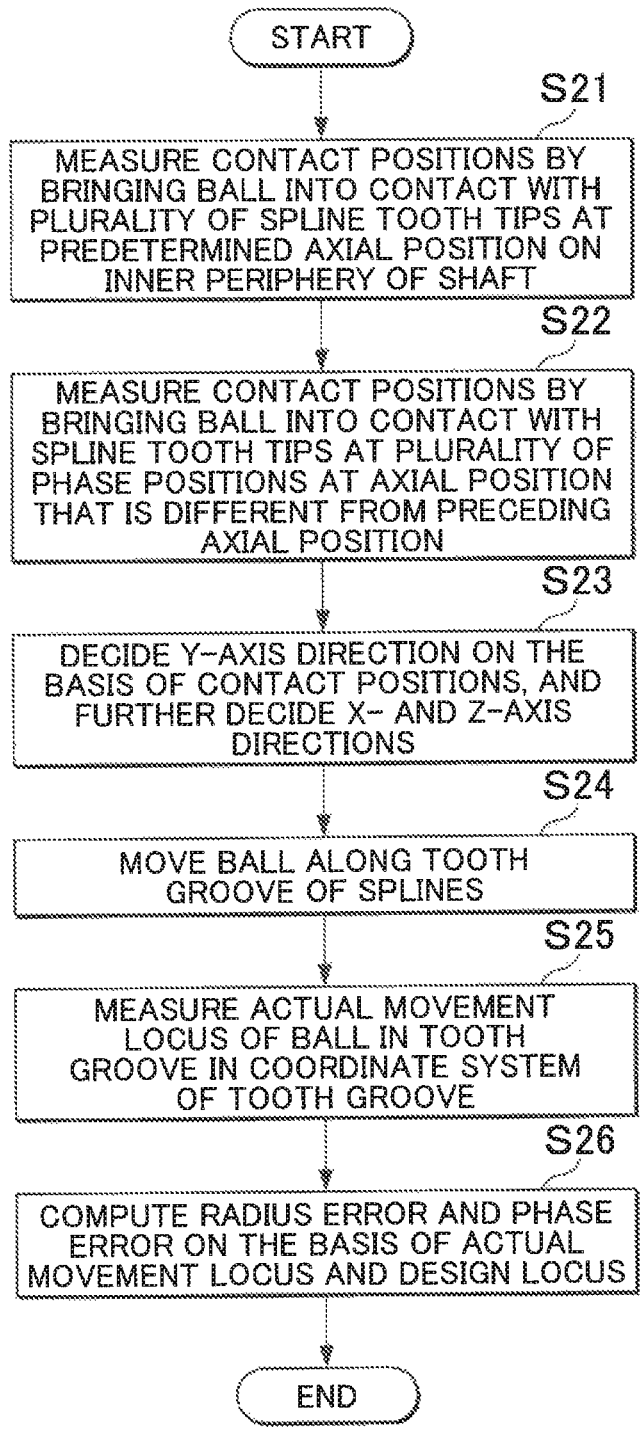
FIG. 17 is a flowchart illustrating operation of the gear measurement apparatus to measure the inside splines.

First, the measurement device 21 measures contact positions by bringing the ball 25 into contact with tooth tips 83 (see FIG. 16) of the plurality of inside splines 18 at a predetermined axial position on the inner periphery of the upper shaft 16 (step S21 of FIG. 17). Next, contact positions are measured by bringing the ball 25 into contact with the tooth tips 83 of the plurality of inside splines 18 at an axial position that is different from the preceding axial position on the inner periphery of the upper shaft 16 (step S22 of FIG. 17). The Y-axis direction is decided on the basis of the contact positions, and the X- and Z-axis directions (three-dimensional coordinate system) are further decided (step S23 of FIG. 17).

Figure 18:
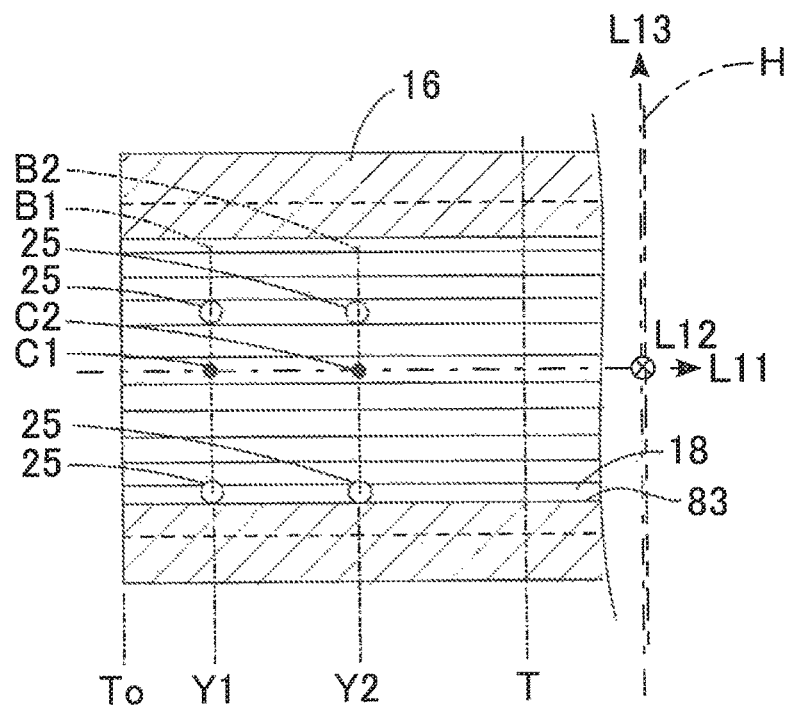
FIG. 18 is a sectional view of an upper shaft taken along the axial direction of the shaft for illustrating a method of deciding the Y-axis direction, the X-axis direction, and the Z-axis direction in the tooth groove of the inside splines.
Figure 19:
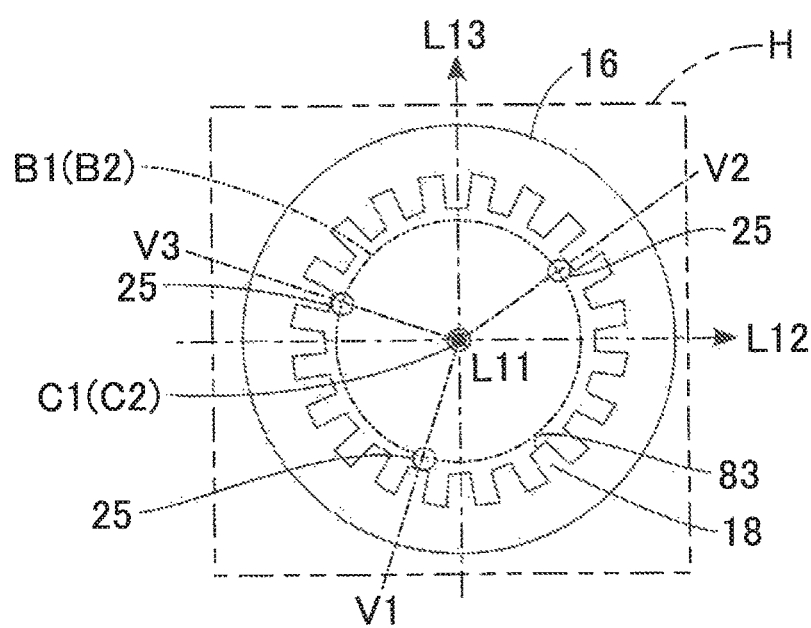
FIG. 19 illustrates the upper shaft of FIG. 18 as seen in the axial direction of the shaft.

Specifically, as illustrated in FIGS. 18 and 19, contact positions are measured by bringing the ball 25 into contact with the tooth tips 83 of the inside splines 18 at three phase positions V1, V2, and V3, for example, at a predetermined axial position Y1 within the effective fitting length of the inside splines 18. Similarly, contact positions are measured by bringing the ball 25 into contact with the tooth tips 83 of the inside splines 18 at the three phase positions V1, V2, and V3 that are the same as those in the preceding measurement at a predetermined axial position Y2 within the effective fitting length of the inside splines 18.

A center C1 of a circle B1 that passes through the phase positions V1, V2, and V3 at the axial position Y1 and a center C2 of a circle B2 that passes through the phase positions V1, V2, and V3 at the axial position Y2 are calculated, and the direction of a line L11 that passes through the centers C1 and C2 is decided as the Y-axis direction of the tooth groove 81 of the inside splines 18. A line L12 that extends in the horizontal direction in a plane H that is orthogonal to the line L11 is decided as the X-axis direction of the tooth groove 81, and a line L13 that is orthogonal to the line L11 and the line L12 is decided as the Z-axis direction of the tooth groove 81.

The measurement device 21 moves the ball 25 within the effective fitting length along the tooth groove 81 of the inside splines 18 (step S24 of FIG. 17), and measures the actual movement locus of the ball 25 in the tooth groove 81 in the coordinate system (X, Y, Z) of the tooth groove 81 (step S25 of FIG. 17). The computation device 24 computes a radius error and a phase error on the basis of the actual movement locus which is measured by the measurement device 21 and the design locus which is stored in the design locus storage device 23 (step S26 of FIG. 17, corresponding to the computation step of the present invention), and the process is ended.

Figure 20:
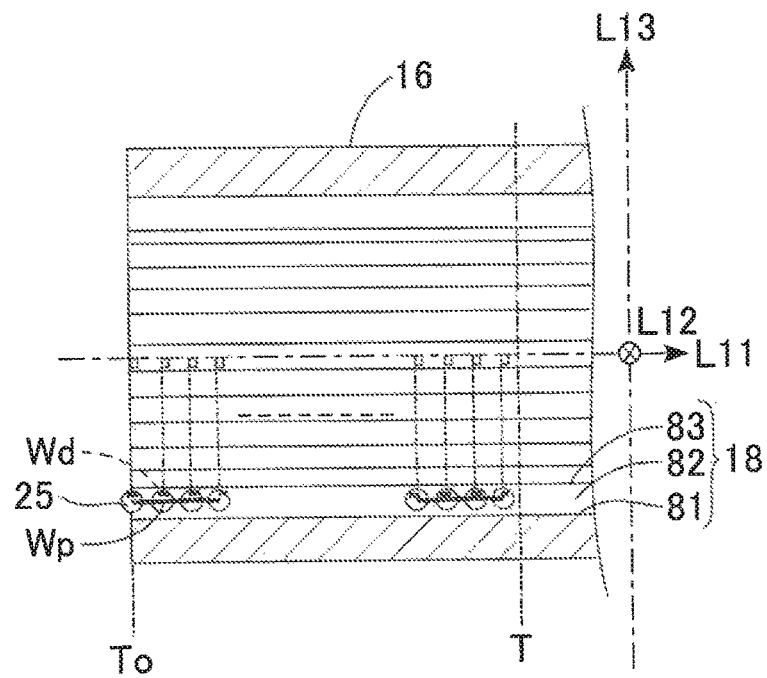
FIG. 20 is a sectional view of the upper shaft taken along the axial direction of the shaft for illustrating a method of calculating a radius error based on the actual movement locus and the design locus in the tooth groove of the inside splines.

Specifically, as illustrated in FIG. 20, an actual movement locus Wp measured by the measurement device 21 is as indicated by the continuous line in the drawing, a design locus Wd acquired by the design locus acquisition device 22 is as indicated by the dashed line in the drawing, and thus an error between the distance between the actual movement locus Wp and the line L11 and the distance between the design locus Wd and the line L11 is calculated as the radius error.

Figure 21:
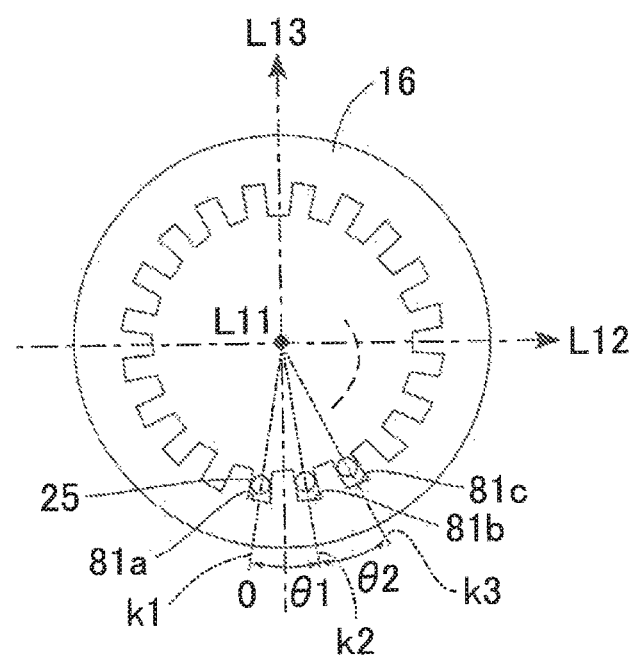
FIG. 21 is a view of the upper shaft as seen in the axial direction of the shaft for illustrating a method of calculating a phase error based on the actual movement locus and the design locus in the tooth groove of the inside splines.

As illustrated in FIG. 21, in addition, when the phase of a line k1 that passes through the actual movement locus Wp and the line L11 in a tooth groove 81a which is positioned at the starting end To of the inside splines 18 is defined as 0, the phase of a line k2 that passes through the actual movement locus Wp and the line L11 in a tooth groove 81b which is adjacent in the counterclockwise direction is defined as θ1 with respect to the line k1, and further, the phase of a line k3 that passes through the actual movement locus Wp and the line L11 in a tooth groove 81c which is adjacent in the counterclockwise direction is defined as θ2 with respect to the line k2. In this way, the phases of all the tooth grooves 81a, 81b, 81c, . . . are calculated as actual phases within the effective fitting length. Meanwhile, the phases of all the tooth grooves 81a, 81b, 81c, . . . are calculated as design phases within the effective fitting length also for the design locus Wd in the same procedure. An error between the actual phase and the design phase is calculated as a phase error.

Figure 22:
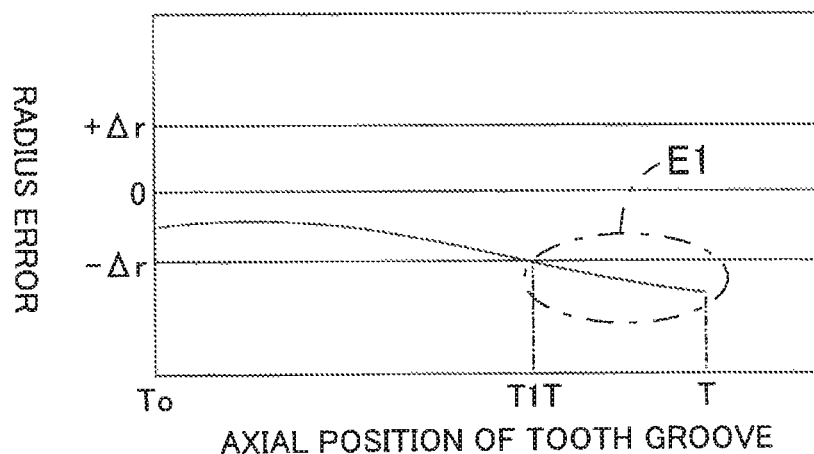
FIG. 22 illustrates the result of measuring a defective upper shaft using the gear measurement apparatus, with the vertical axis indicating a radius error and with the horizontal axis indicating the axial position of the splines.

FIG. 22 illustrates the result of measuring the tooth groove 81a using the gear measurement apparatus 20, with the vertical axis indicating the radius error and with the horizontal axis indicating the axial position of the tooth groove 81 of the inside splines 18. As is clear from FIG. 22, the radius error of the inside splines 18 exceeds an acceptable value –Δr within a range (part E1 surrounded by the dashed circle in the drawing) from a position advanced by a length T1T in the axial direction from the starting end To of the inside splines 18 to a position the length T away therefrom.

Figure 23:
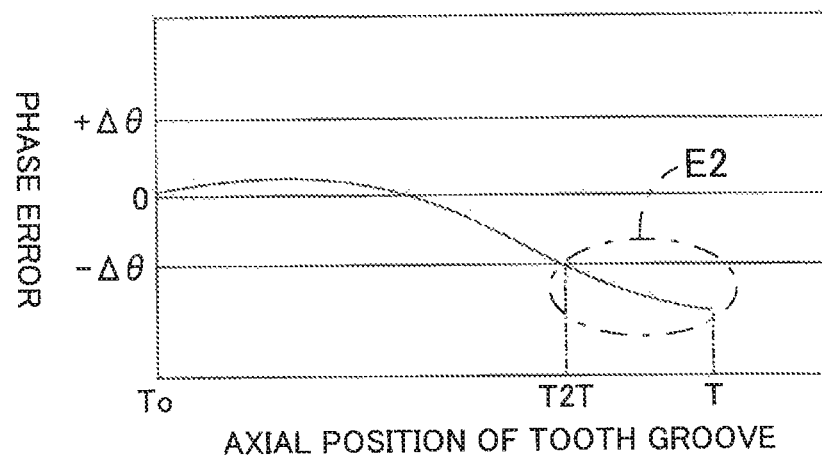
FIG. 23 illustrates the result of measuring the defective upper shaft using the gear measurement apparatus, with the vertical axis indicating a phase error and with the horizontal axis indicating the axial position of the splines.

In addition, FIG. 23 illustrates the result of measuring the tooth groove 81a using the gear measurement apparatus 20, with the vertical axis indicating the phase error and with the horizontal axis indicating the axial position of the tooth groove 81 of the inside splines 18. As is clear from FIG. 23, the phase error of the inside splines 18 exceeds an acceptable value –Δθ within a range (part E2 surrounded by the dashed circle in the drawing) from a position advanced by a length T2T in the axial direction from the starting end To of the inside splines 18 to a position the length T away therefrom. In the case of the steering column 15 which includes such inside splines 18, the sliding resistance at the time of telescoping is large, and the inside splines 18 turned out to be defective.

Figure 24:
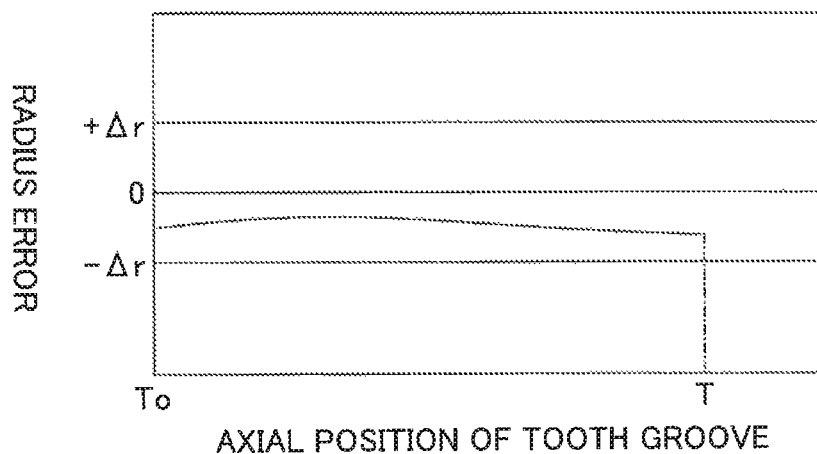
FIG. 24 illustrates the result of measuring a conforming upper shaft using the gear measurement apparatus, with the vertical axis indicating a radius error and with the horizontal axis indicating the axial position of the splines.
Figure 25:
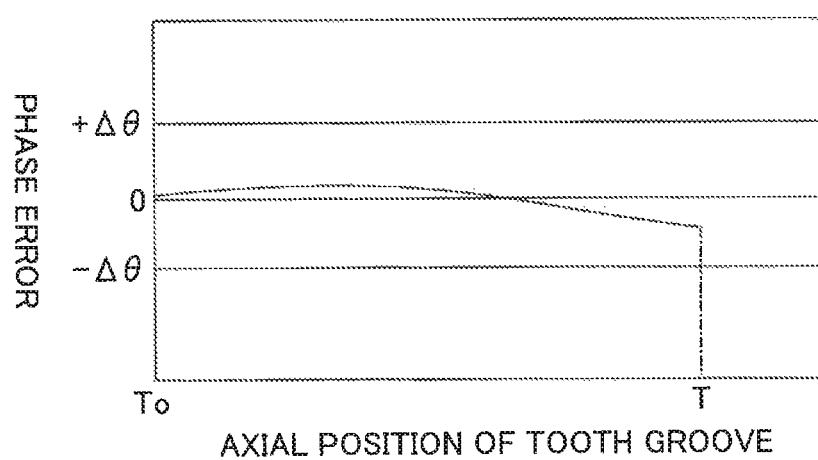
FIG. 25 illustrates the result of measuring the conforming upper shaft using the gear measurement apparatus, with the vertical axis indicating a phase error and with the horizontal axis indicating the axial position of the splines.

Meanwhile, FIG. 24 corresponds to FIG. 22, and illustrates the result of measuring different inside splines 18 using the gear measurement apparatus 20. As is clear from FIG. 24, the radius error of the inside splines 18 does not significantly vary. FIG. 25 corresponds to FIG. 23, and illustrates the result of measuring different inside splines 18 using the gear measurement apparatus 20. As is clear from FIG. 25, the phase error of the inside splines 18 does not significantly vary. In the case of the steering column 15 which includes such inside splines 18, the sliding resistance at the time of expansion and contraction is not large, and the inside splines 18 turned out to be conforming.

Figure 26:
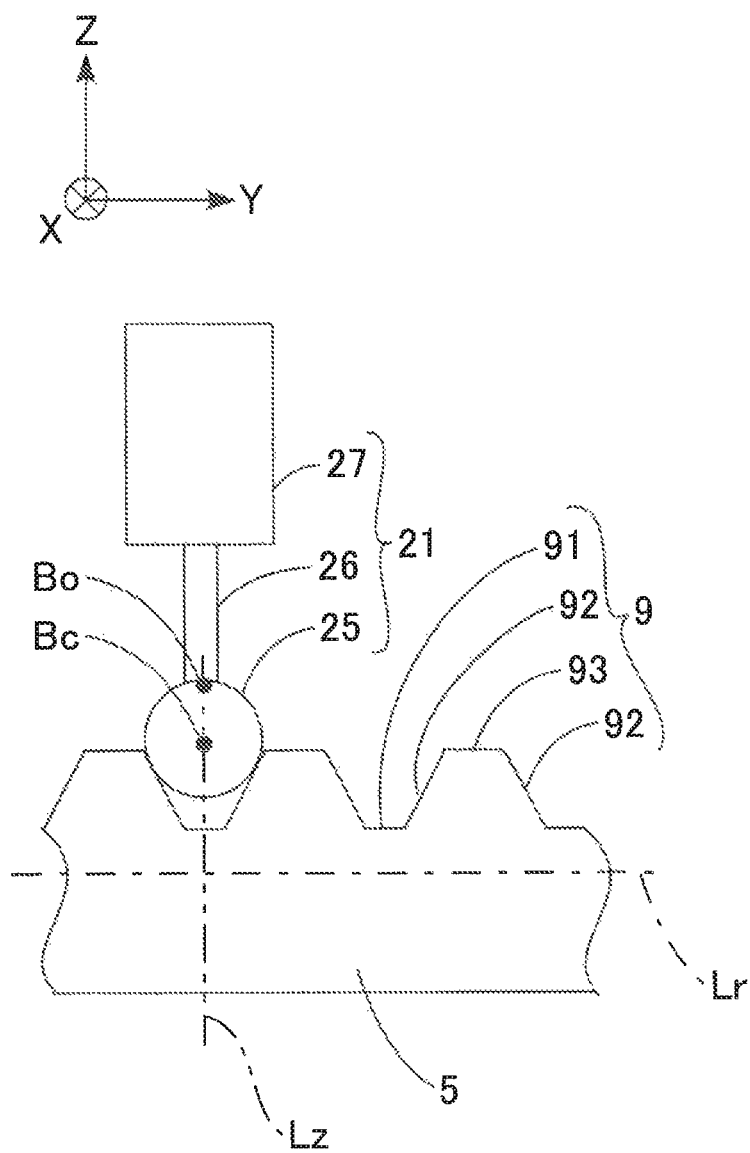
FIG. 26 is a view for illustrating an over ball point of a ball of the gear measurement apparatus.

In the embodiment discussed above, the measurement device 21 is configured to measure the movement locus of the center point Bc of the ball 25. However, the measurement device 21 may be configured to measure the movement locus of an over ball point of the ball 25. As illustrated in FIG. 26, an over ball point Bo of the ball 25 refers to a point at which a line Lz that is orthogonal to the center axis Lr of the rack shaft 5 and that passes through the center point Bc of the ball 25 which is positioned in the tooth groove 91 crosses a portion of the outer peripheral surface of the ball 25 that is on the opposite side of the ball 25 from the tooth groove 91. This configuration is also applicable to the case of the inside splines 18 in a similar manner.

In the measurement step (measurement device 21), the rack teeth 9 are measured using an orthogonal two-axis coordinate system (X, Z), among the three-dimensional coordinate system. However, the rack teeth 9 may be measured using a circular coordinate system (polar coordinate system). Meanwhile, the inside splines 18 are measured using an orthogonal three-axis coordinate system (X, Y, Z), among the three-dimensional coordinate system. However, the inside splines 18 may be measured using a cylindrical coordinate system (a type of the polar coordinate system).

The measurement device 21 is a three-dimensional measuring instrument that has a groove copying function. However, the measurement device 21 may be a shape measuring instrument, an optical measuring instrument, or the like that has a function of outputting all the copied and measured point coordinate values in two or more directions. In the description, the VGR rack is measured. However, the CGR rack may also be measured in a similar manner. In the description, the inside splines 18 are measured. However, the outside splines 19 may also be measured in a similar manner. In addition, a helical gear and a bevel gear may also be measured in a similar manner.

Next, the effect of the embodiment will be discussed. The embodiment provides a measurement method for a gear (rack teeth 9, inside splines 18), including a measurement step of measuring an actual movement locus Rp, Wp of a ball 25 that is moved along a tooth groove 91, 81 of the gear (rack teeth 9, inside splines 18) as a shape evaluation index for the gear (rack teeth 9, inside splines 18).

With this configuration, the measurement is not affected by the direction of the teeth of the gear, which enables evaluation of meshing and fitting of the gear. In the case of the VGR rack, for example, the tooth surfaces 92 of the rack teeth 9 are constituted of curved surfaces. Thus, a reference pin for use in the OPD cannot be disposed so as to be in line contact with the tooth surfaces 92, and the rack teeth 9 cannot be measured. However, the ball 25 can be disposed so as to be in point contact with the tooth surfaces 92, which enables a measurement of the rack teeth 9. In the case of the inside splines 18, meanwhile, fitting over the entire periphery within the fitting length L of the inside splines 18 can be evaluated by rolling the ball 25 along the entire tooth groove 81.

In the measurement step, an actual movement locus of a center point Bc of the ball 25 is measured. Thus, the movement state of the ball 25 can be measured easily. In the measurement step, an actual movement locus of an over ball point Bo of the ball 25 is measured. Thus, the fitting can be evaluated as in the OPD in which the reference pin is used.

The measurement method for a gear (rack teeth 9, inside splines 18) further includes: an acquisition step of acquiring a design locus Rd, Wd which is a movement locus, in design, of the ball 25 for a case where the ball 25 is moved along the tooth groove 91, 81 of the gear (rack teeth 9, inside splines 18); and a computation step of computing an error between the actual movement locus Rp, Wp which is measured in the measurement step and the design locus Rd, Wd which is acquired in the acquisition step. This makes it possible to determine whether the gear (rack teeth 9, inside splines 18) is conforming or defective.

In the case where the gear is rack teeth 9 formed on a rack shaft 5, in the measurement step, a reference point (arc center Qc) of each tooth groove 91 is decided on the basis of a measurement of an arc outer peripheral surface (outer peripheral edge Q) positioned on a back side of the tooth groove 91 of each rack tooth 9, and the actual movement locus Rp of the ball 25 for each rack tooth 9 is measured in the case where the decided reference point of each tooth groove 91 is determined as an origin point. Thus, the measurement accuracy of the actual movement locus Rp of the ball 25 can be enhanced.

In the measurement step, in the case where an axial direction of a rack shaft 5 is determined as a Y axis, a two-dimensional coordinate system of a plane that is orthogonal to the Y axis for each tooth groove 91 is decided on the basis of a measurement of a tooth tip 93 of each rack tooth 9, and the actual movement locus Rp of the ball 25 for each rack tooth 9 is measured in the two-dimensional coordinate system which is decided for each tooth groove 91. Thus, the measurement accuracy of the actual movement locus Rp of the ball 25 can be further enhanced. In the case where the gear is rack teeth 9 formed on a rack shaft 5, the gear measurement method is applied to a rack with a gear ratio that is varied in an axial direction of the rack shaft 5. Thus, the rack teeth 9 can be evaluated directly, which improves the measurement accuracy compared to the rack measurement method according to the related art.

In the case where the gear is inside splines 18, in the measurement step, a three-dimensional coordinate system for a tooth groove 81 of each inside spline 18 is decided on the basis of a measurement of a tooth tip 83 of each inside spline 18, and the actual movement locus Wp of the ball 25 for each inside spline 18 is measured in the decided three-dimensional coordinate system. Thus, the measurement accuracy of the actual movement locus Wp of the ball 25 can be further enhanced.

The embodiment also provides a measurement apparatus 20 for a gear (rack teeth 9, inside splines 18) that measures a shape of a tooth groove 91, 81 of a gear (rack teeth 9, inside splines 18), including a measurement device 21 that measures an actual movement locus of a ball 25 that is moved along the tooth groove 91, 81 of the gear (rack teeth 9, inside splines 18) as a shape evaluation index for the gear (rack teeth 9, inside splines 18). The measurement apparatus 20 for a gear (rack teeth 9, inside splines 18) further includes: a storage device 23 that stores a design locus which is a movement locus, in design, of the ball 25 for a case where the ball 25 is moved along the tooth groove 91, 81 of the gear (rack teeth 9, inside splines 18); and a computation device 24 that computes an error between the actual movement locus which is measured by the measurement device 21 and the design locus which is stored in the design locus storage device 23. This makes it possible to obtain an effect that is similar to the effect obtained by the measurement method for the gear (rack teeth 9, inside splines 18).

What is claimed is:

1. A gear measurement method comprising steps of:
    rolling a measurement ball along a tooth groove of a gear such that the ball simultaneously contacts both of opposing surfaces of the tooth groove, the gear being rack teeth formed on a shaft member;
    measuring an actual movement locus of the ball at a center point of the ball as the ball is rolled along the tooth groove of the gear, the actual movement locus being a shape evaluation index for the gear, a reference point of each tooth groove based on a measurement of an arc outer peripheral surface positioned on a back side of each tooth groove of each rack tooth of the gear, the actual movement locus of the ball for each rack tooth being measured by setting the decided reference point of each tooth groove as an origin point and an axial direction of a rack shaft is determined as a Y-axis, a two-dimensional coordinate system of a plane that is orthogonal to the Y-axis for each tooth groove is set based on a measurement of a tooth tip of each rack tooth of the gear, the actual movement locus of the ball for each rack tooth being measured in the set two-dimensional coordinate system;

acquiring a design locus, which is a movement locus in design, of the ball where the ball is moved along the tooth groove of the gear; and computing an error between the measured actual movement locus and the acquired design locus.

2. The gear measurement method according to claim 1, further comprising measuring the actual movement locus of an over ball point of the ball.

3. The gear measurement method according to claim 1, wherein:

the gear measurement method is applied to a rack with a gear ratio that is varied in the axial direction of the rack shaft.

4. A gear measurement apparatus that measures a shape of a tooth groove of a gear, the gear measurement apparatus comprising:

a measurement ball configured to be rolled along the tooth groove of the gear such that the ball simultaneously contacts both of opposing surfaces of the tooth groove, the gear being rack teeth formed on a shaft member;

a measurement device configured to measure an actual movement locus of the ball at a center point of the ball as the ball is rolled along the tooth groove of the gear, the actual movement locus being a shape evaluation index for the gear, a reference point of each tooth groove based on a measurement of an arc outer peripheral surface positioned on a back side of each tooth groove of each rack tooth of the gear, the actual movement locus of the ball for each rack tooth being measured by setting the decided reference point of each tooth groove as an origin point and an axial direction of a rack shaft is determined as a Y-axis, a two-dimensional coordinate system of a plane that is orthogonal to the Y-axis for each tooth groove is set based on a measurement of a tooth tip of each rack tooth of the gear, the actual movement locus of the ball for each rack tooth being measured in the set two-dimensional coordinate system;

a design locus acquisition device configured to acquire a design locus, which is a movement locus in design, of the ball where the ball is moved along the tooth groove of the gear; and a computing device configured to compute an error between the measured actual movement locus and the acquired design locus.

5. The gear measurement apparatus according to claim 4, further comprising:

a design locus storage device that stores the design locus.

* * * * *